US011643336B2

(12) United States Patent
Pullen et al.

(10) Patent No.: US 11,643,336 B2
(45) Date of Patent: May 9, 2023

(54) PRECURSOR MATERIALS FOR LI-ION BATTERY CATHODE SYNTHESIS

(71) Applicant: CAMX Power LLC, Lexington, MA (US)

(72) Inventors: Adrian W. Pullen, Boston, MA (US); Suresh Sriramulu, Lexington, MA (US)

(73) Assignee: CAMX Power LLC, Lexington, MA (US)

( * ) Notice: Subject to any disclaimer, the term of this patent is extended or adjusted under 35 U.S.C. 154(b) by 0 days.

(21) Appl. No.: 17/688,296

(22) Filed: Mar. 7, 2022

(65) Prior Publication Data
US 2022/0185692 A1 Jun. 16, 2022

Related U.S. Application Data

(62) Division of application No. 16/662,616, filed on Oct. 24, 2019, now Pat. No. 11,299,402.

(51) Int. Cl.
*H01B 1/08* (2006.01)
*H01M 4/52* (2010.01)
(Continued)

(52) U.S. Cl.
CPC ........... *C01G 53/04* (2013.01); *C01G 53/006* (2013.01); *H01B 1/08* (2013.01); *H01M 4/52* (2013.01);
(Continued)

(58) Field of Classification Search
CPC ............. H01B 1/08; H01B 1/20; H01M 4/52; H01M 4/0525; C01G 53/04
See application file for complete search history.

(56) References Cited

U.S. PATENT DOCUMENTS 6,071,649 A 6/2000 Mao et al.
6,241,959 B1 * 6/2001 Cho ................ H01M 4/485
252/519.15
(Continued)

FOREIGN PATENT DOCUMENTS

CN 105244492 A 1/2016
CN 106410182 A 2/2017
WO 1997/49136 A1 12/1997

OTHER PUBLICATIONS

Park et al. "Improved cycling stability of Li(Ni0.90Co0.05MnO.05)O2 through microstructure modification by boron doping for Li-ion batteries", Adv. Energy Mater. 2018, 8, 1801202 (9 pages).*
(Continued)

*Primary Examiner* — Mark Kopec
(74) *Attorney, Agent, or Firm* — Dinsmore & Shohl LLP; Weston R. Gould

(57) ABSTRACT

Provided are processes for the production of particles for use as a precursor material for synthesis of Li-ion cathode active material of a lithium-ion cell comprising: a non-lithiated nickel oxide particle of the formula $MO_x$ wherein M comprises 80 at % Ni or greater and wherein x is 0.7 to 1.2, M optionally excluding boron in the $MO_x$ crystal structure; and a modifier oxide intermixed with, coated on, present within, or combinations thereof the non-lithiated nickel oxide particle, wherein the modifier oxide is associated with the non-lithiated nickel oxide such that a calcination at 500 degrees Celsius for 2 hours results in crystallite growth measured by XRD of 2 nanometers or less.

11 Claims, 5 Drawing Sheets

(51) Int. Cl.
*C01G 53/04* (2006.01)
*H01M 10/0525* (2010.01)
*C01G 53/00* (2006.01)
B82Y 40/00 (2011.01)
B82Y 30/00 (2011.01)

(52) U.S. Cl.
CPC ......... H01M 10/0525 (2013.01); *B82Y 30/00* (2013.01); *B82Y 40/00* (2013.01); *C01P 2002/72* (2013.01); *C01P 2004/64* (2013.01)

(56) References Cited

U.S. PATENT DOCUMENTS

| | | | |
|---|---|---|---|
| 2008/0280205 A1* | 11/2008 | Jiang | H01M 4/525 |
| | | | 423/598 |
| 2013/0247363 A1* | 9/2013 | Nelson | H01M 4/26 |
| | | | 252/182.1 |
| 2015/0291778 A1 | 10/2015 | Musick et al. | |
| 2016/0181605 A1 | 6/2016 | Li et al. | |
| 2016/0301063 A1 | 10/2016 | Yukinobu et al. | |
| 2018/0233740 A1 | 8/2018 | You et al. | |
| 2018/0261832 A1 | 9/2018 | Nho et al. | |
| 2021/0135214 A1 | 5/2021 | Goto et al. | |

OTHER PUBLICATIONS

Ida et al "Sintering of High-Purity Nickel Oxide, II", Journal of the American Ceramic Society-Iida and Ozaki vol. 42, No. 5, 1959.
Chen et al "Optimization of B2O3 coating process for NCA cathodes to achieve long-term stability for application in lithium ion batteries", Energy 222 (2021) 119913.

* cited by examiner

PRECURSOR MATERIALS FOR LI-ION BATTERY CATHODE SYNTHESIS

CROSS REFERENCE TO RELATED APPLICATION

This application is a divisional of U.S. application Ser. No. 16/662,616 filed Oct. 24, 2019, now U.S. Pat. No. 11,299,402, the entire contents of which are incorporated herein by reference.

FIELD

Disclosed is a precursor material for lithium nickel-oxide based cathode materials.

BACKGROUND

Layered structure lithium nickelate ($LiNiO_2$)-based materials have been developed for Lithium-ion battery cathodes because they generally have lower cost, higher capacity and higher rate capability than the historically predominant $LiCoO_2$ cathode material. Unfortunately, the electrochemical performance of stoichiometric $LiNiO_2$ is poor with rapid fade of performance with cycling. To address these shortcomings, non-nickel, elemental additives (such as Co and Mn) have been formulated into $LiNiO_2$ enabling reproducible synthesis and improving the cycling performance of the cathode material in a Li-ion battery. As demands for energy density have increased, current research is focused on reducing the amount of stabilizing elements, such as Co, to capture the capacity of high Ni materials while maintaining cycling performance. $LiNiO_2$ materials with low levels of Co, however, are difficult to synthesize. Also, the quality of the resulting cathode materials depends in large part on the quality of the metal hydroxide precursor materials.

As such, new precursor materials are needed to address the demands for high capacity materials with long cycle life.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are processes of forming particles that may be used in the synthesis of final electrochemically active material employed in a cathode of a lithium-ion cell. The particles include: a non-lithiated nickel oxide particle of the formula $MO_x$ wherein M comprises 80 at % Ni or greater and wherein x is 0.7 to 1.2, wherein M optionally excludes boron in the $MO_x$ crystal structure; and boron oxide intermixed with, coated on, present within, or combinations thereof the non-lithiated nickel oxide particle, wherein the boron oxide is associated with the non-lithiated nickel oxide such that a calcination at 500 degrees Celsius for 2 hours results in crystallite growth measured by XRD of 2 nanometers or less and optionally crystallites below 20 nm in size. The particles provide a new synthesis route for electrochemically active cathode materials that promote use of high Ni content capitalizing on the excellent capacity of these materials while promoting long cycle life.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings and in which:

DETAILED DESCRIPTION

Figure 1:
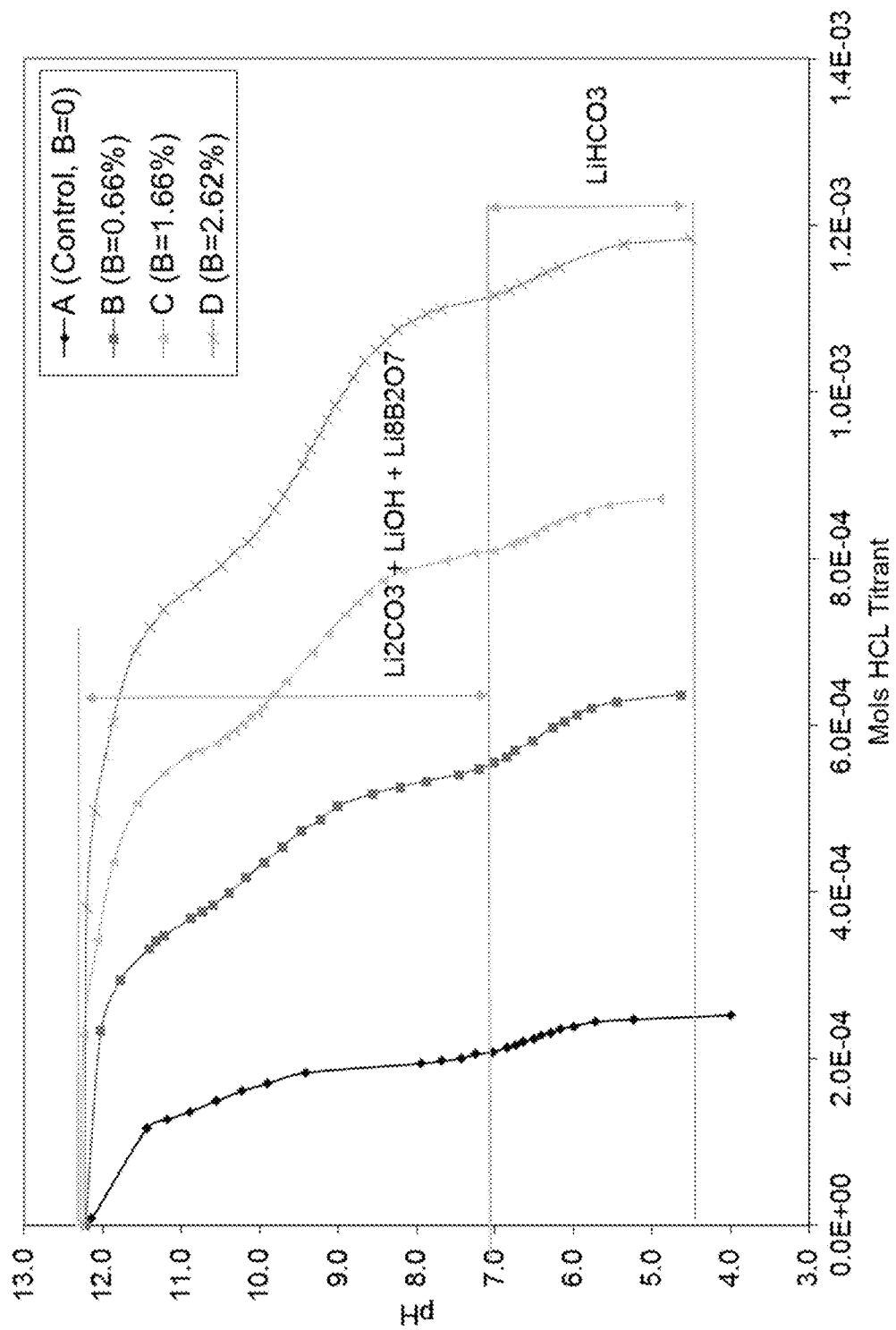
FIG. 1 is a titration curve illustrating that the boron species is water soluble and not within the crystallites or crystal structure of the cathode material synthesized from the precursor particle as provided herein.

Precursor materials for the synthesis of electrochemically active cathode materials suitable for use in a lithium ion cell are disclosed herein. The precursor materials contain particles of nickel-based oxides incorporating boron, optionally as boron oxide. Such precursor materials may be used in the synthesis of final lithiated cathode materials for Li-ion batteries. It has been found that the electrochemical performance of cathode materials made from such nickel oxides containing the above listed elements is vastly improved.

The term "non-lithiated" as used herein is defined as the absence of Li in the particle and the absence of any prior lithium having been present in the particle such that the resulting crystallinity of the particle is not defined by the presence of Li in structure or composition.

Typically, metal oxides are not preferred as a precursor for the synthesis of high-nickel cathode materials for Li-ion batteries because the resulting cathode materials exhibit poor electrochemical performance. The reaction of a lithium source (such as LiOH) with the metal oxide can result in the formation of a layered metal oxide; however, typically the rate of reaction of the lithium source with the metal oxide is slow. With increasing time and temperature, the primary crystallite size of the metal oxide increases rapidly. As the primary crystallite size of the metal oxides increases, the rate of reaction with lithium is further reduced. Consequently, the layered lithium metal oxide formed with the metal oxide has poor crystalline quality (with many crystalline defects).

The quality of the layered lithium metal oxide can be improved by calcining at high temperature for a long time. However, with increasing nickel content of the precursor material (and hence the cathode material), the maximum time and the maximum temperature has to be limited to reduce the propensity for decomposition of the layered metal oxide. For these reasons, synthesis of cathode materials typically begins with a precipitated metal hydroxide precursor, which is then mixed with a lithium source and calcined.

Even during the calcination step in the synthesis of lithiated oxides from metal hydroxides similar issues as described above can occur. Essentially, two parallel reactions occur during the synthesis of cathode materials from metal hydroxide precursors. The first is the dehydration of the metal hydroxide to form metal oxide, and the second is the lithation of metal hydroxide and/or oxide to form the layered lithiated metal oxide structure. Typically, the overall rate of reaction of the lithium source with the metal oxide is slower than the rate of reaction of lithium with the metal hydroxide. Initially, the metal oxide forms with a certain primary crystallite size. However, with increasing time and temperature, the crystallite size of the metal oxide increases rapidly. As the primary crystallite size of the metal oxide increases, the rate of reaction with lithium is further reduced. Consequently, the layered lithium metal oxide formed with the metal oxide has poorer quality (with many crystalline defects) than the layered lithium metal oxide formed with the metal hydroxide. As described above, good quality cathode materials are difficult to synthesize with the metal oxides.

The inventors have now produced a metal oxide particle that can be lithiated to form electrochemically active particles used in cathodes of a lithium ion battery that do not suffer the drawbacks of the prior materials, do not undergo significant and undesirable crystal growth and do not exhibit crystalline defects thereby improving performance by enabling the lithation of the metal oxide at lower temperatures. The provided materials incorporate an oxide of boron into the dehydrated metal oxide materials. It was found that the incorporation of boron yields oxide particles that are more easily lithiated, are of more uniform quality, and are an advantageous material precursor to synthesize cathode materials for Li-ion batteries.

Provided are non-lithiated nickel oxide particles of the formula $MO_x$ wherein M comprises 80 at % Ni or greater and wherein x is 0.7 to 1.2. The particles further include a modifier that is an oxide of boron wherein the modifier is coated on the particles, present within the particles, or combinations thereof. The term "present within" as used herein excludes incorporation of the modifier in the crystal structure of the particles. The modifier may be present in the intercrystalline space, coated on or otherwise associated with the particles, however. The presence of the modifier creates a particle with the property of crystallite growth measured by XRD of 2 nanometers (nm) or less and/or optionally overall crystallite size (average cross sectional diameter) of at or below 30 nm, optionally at or below 20 nm, upon calcination at 500 degrees Celsius (° C.) for 2 hours. This lack of crystallite growth is optionally throughout the entire particle, or within a portion of the particle.

M in the formula $MO_x$ includes or is Ni. Ni is present in total M at 80 atomic percent (at %) or greater. Optionally M is present at or greater than 85 atomic percent, optionally 90 atomic percent, optionally 91 atomic percent, optionally 92 atomic percent, optionally 93 atomic percent, optionally 94 atomic percent, optionally 95 atomic percent, optionally 96 atomic percent, optionally 97 atomic percent, optionally 98 atomic percent, optionally 99 atomic percent, optionally 99.5 atomic percent, optionally 99.6 atomic percent, optionally 99.7 atomic percent, optionally 99.8 atomic percent, optionally 99.9 atomic percent.

M optionally includes one or more additional metals. A second metal is optionally Mg, Sr, Co, Al, Ca, Cu, Zn, Mn, V, Ba, Zr, Ti, Nb, Ta, Cr, Fe, Mo, W, Hf, B, or any combination thereof. An additional metal is optionally present in an amount of about 0.1 at % to about 20 at %. Optionally, M includes an additional metal that is or includes cobalt, with the cobalt concentration in the range of 0.1 at % to about 20 at %, optionally, in the range of 1 at % to about 15 at %. In some aspects, the additional metal is or includes Mn present in an amount of about 0.1 at % to about 20 at %. Optionally, the additional metal is or includes Al present in an amount of about 0.1 at % to about 20 at %.

In some aspects, M includes Ni at 80 at % or greater, Co at 0.1 at % to 20 at %, and Mn at 0.1 at % to 20 at %. Optionally M includes Ni at 80 at % or greater and Co at 0.1 at % to 20 at %.

Particles as provided herein include a modifier element that is an oxide of boron. In some aspects, the modifier element is coated on the particles. Coated on optionally means completely coating the particles or partially coating the particles. In some aspects, a modifier element is present within a particle. Present within is optionally present throughout the particle in a substantially uniform matter or distributed within in varying concentration throughout a portion of the entire particle volume. Optionally, a modifier element is both coated on and present within a particle.

A modifier element is optionally present within an oxide particle at a weight percent (wt %) of 1 wt % or less. In some aspects, a modifier element is present at a weight percent of or less than 0.9 wt %, optionally 0.8 wt %, optionally 0.7 wt %, optionally 0.6 wt %, optionally 0.5 wt %, optionally 0.4 wt %, optionally 0.3 wt %, optionally 0.2 wt %, optionally 0.1 wt %.

In some aspects, the modifier element present in the nickel-based oxide material is water-insoluble.

Particles as provided herein may be made by combining one or more hydroxide precursor materials in powder form and a modifier element oxide (optionally micronized) and intermixing the materials. The hydroxide precursor materials may be formed by a precipitation or co-precipitation processes as recognized in the art. Optionally the precursor material powder can be formed by ball milling or other milling procedure as recognized in the art. The intermixed materials are then subjected to a first calcination at a temperature of 600° C. or less for a calcination time of 6 hours or less. The resulting crystalline particle includes crystals of metal oxide intermixed with a modifier element. Without being limited to one particular theory, it is believed that the modifier element is present within the inter-crystal spaces when prepared as provided herein. The presence of this modifier element then retards further or excessive rates of crystal growth upon successive calcinations alone or in the presence of other desired elements such as Li, illustratively LiOH.

For the formation of the particles as provided herein, the intermixed particles are subjected to a first calcination at a calcination temperature of 600° C. or less. In the formation of a precursor material as provided herein, there is no need for a second calcination unless or until an electrochemically active particle is formed such as by subsequent calcinations with Li, or for other further processing. As such, the term "first calcination" is provided herein for illustrative purposes only. Optionally, a first calcination temperature is less than 550° C.; is optionally less than 500° C.; is optionally less than 400° C. A first calcination time is optionally less than or equal to 6 hours, optionally 3 hours, optionally 2 hours, optionally 1 hour, optionally 0.5 hours.

The resulting precursor particles are a characterized by an arrangement of modifier element within or on the particle such that a second calcination at 500 degrees Celsius for 2 hours results in additional crystallite growth measured by XRD of 2 nanometers or less and/or a resulting crystallite size of less than 40 nm, optionally less than 35 nm, optionally less than 30 nm, optionally less than 25 nm, optionally less than 20 nm. It is believed that this retarded crystal growth that occurs during subsequent calcinations allows the particles to be successfully used as precursor materials for the formation of electrochemically active lithium metal oxides in a cathode of a lithium ion cell. The retarded crystal growth allows formation of materials that are free of or substantially free of crystalline defects.

In some aspects, the particles are nickel oxide further including the modifier element B. The boron-containing nickel oxide precursor may be synthesized by mixing boron oxide and nickel-containing hydroxide, and calcining the resulting mixture to a specified temperature for a specified time. The weight ratio of boron oxide to nickel hydroxide may be <1%; <0.75%; <0.5%, <0.25%, or <0.1%. The specified temperature of the first calcination may be less than 600° C.; optionally less than 550° C.; optionally less than 500° C.; optionally less than 400° C. The specified time may be less than 6 hours, optionally less than 3 hours, optionally less than 2 hours, optionally less than 1 hour, optionally less than 0.5 hours.

In some aspects, the precursor material is Ni—Co mixed oxide incorporating a modifier element of boron. Optionally, the amount of Ni (relative to total Ni and Co) is less 99 at %, optionally less than 95 at %, optionally less than 90 at %. Optionally, the amount of Ni (relative to total Ni and Co) is equal to or greater than 70 at %, optionally 75 at %, optionally 80 at %, optionally 85 at %, optionally 90 at %, optionally 91 at %, optionally 92 at %, optionally 93 at %, optionally 94 at %, optionally 95 at %, optionally 96 at %, optionally 97 at %, optionally 98 at %, optionally 99 at %.

In some aspects, the precursor material is Ni—Co—Mn mixed oxide incorporating an element boron. The amount of Ni relative to the total Ni, Co, and Mn is equal to or less than 99 at %, optionally 98 at %, optionally 95 at %; optionally 85 at %. Optionally, the amount of Ni (relative to total Ni, Co, and Mn) is equal to or greater than 70 at %, optionally 75 at %, optionally 80 at %, optionally 85 at %, optionally 90 at %, optionally 91 at %, optionally 92 at %, optionally 93 at %, optionally 94 at %, optionally 95 at %, optionally 96 at %, optionally 97 at %, optionally 98 at %, optionally 99 at %.

The resulting non-lithiated oxide particles are a grouping of crystallites throughout a portion or the entirety of the particles. The average crystallite size as measured by X-Ray diffraction is optionally less than or equal to 40 nm, optionally 30 nm, optionally 25 nm, optionally 20 nm. Optionally, upon exposure to a second calcination optionally in the absence of any added elements, or optionally in the presence of Li, a second calcination at 500 degrees Celsius for 2 hours results in crystallite growth measured by XRD of 2 nanometers or less and/or a crystallite size of less than 40 nm, optionally less than 35 nm, optionally less than 30 nm, optionally less than 25 nm, optionally less than 20 nm.

As such, according to some aspects provided herein are non-lithiated nickel oxide particles of the formula $MO_x$ wherein M comprises 80 at % Ni or greater and wherein x is 0.7 to 1.2, M optionally excluding boron in the $MO_x$ crystal structure and having an average crystallite size as measured by X-Ray Diffraction of less than 40 nm, optionally less than 30 nm, optionally less than 25 nm, optionally less than 20 nm. Such non-lithiated nickel oxide particles optionally include Ni relative to the total metal of equal to or less than 99 at %, optionally 98 at %, optionally 95 at %; optionally 85 at %. Optionally, the amount of Ni (relative to total metal) is equal to or greater than 70 at %, optionally 75 at %, optionally 80 at %, optionally 85 at %, optionally 90 at %, optionally 91 at %, optionally 92 at %, optionally 93 at %, optionally 94 at %, optionally 95 at %, optionally 96 at %, optionally 97 at %, optionally 98 at %, optionally 99 at %. The particles optionally include Ni an one or more additional metals. An additional metal is optionally Mg, Sr, Co, Al, Ca, Cu, Zn, Mn, V, Ba, Zr, Ti, Nb, Ta, Cr, Fe, Mo, W, Hf, B, or any combination thereof. An additional metal is optionally present in an amount of about 0.1 at % to about 20 at %. Optionally, an additional metal is or includes cobalt, with the cobalt concentration in the range of 0.1 at % to about 20 at %, optionally, in the range of 1 at % to about 15 at %. In some aspects, the additional metal is or includes Mn present in an amount of about 0.1 at % to about 20 at %. Optionally, the additional metal is or includes Al present in an amount of about 0.1 at % to about 20 at %. Optionally, such particles are a Ni—Co mixed oxide incorporating a modifier element of boron, optionally a Ni—Co—Mn mixed oxide incorporating a modifier element of boron where the Ni—Co oxide or Ni—Co—Mn oxide are as otherwise described herein.

Also provided are hydroxide precursors of lithiated nickel oxides as described herein whereby the hydroxide precursors include boron within the particles so as to also reduce crystal growth of oxides during the formation of the final lithiated nickel oxide particle. As described above, during the lithiation process of typical metal hydroxides, two competing reactions occur: one dehydration of the metal hydroxide to a metal oxide; and two, the simultaneous lithiation of the metal hydroxide/oxide to form the layered lithiated metal oxide structure. As the reaction rate of the lithium source with a metal oxide is slower than the rate of reaction of lithium with the metal hydroxide, metal oxide crystal growth occurs during the sintering reaction resulting in crystals that reduce the rate of reaction with lithium relative to hydroxide materials. This produces a non-uniform lithiated product with crystal defects. This disclosure addresses this problem in a second way, by formation of coprecipitated boron-containing nickel hydroxides where the boron reduces the rate of oxide crystal growth during lithiation such that more uniform lithiated particles are formed with fewer crystal defects.

As such, provided are non-lithiated nickel hydroxides that include within the particles boron that is arranged to serve as an oxide crystal growth inhibitor during subsequent high temperature reactions in the presence or absence of lithium. The non-lithiated nickel hydroxide particles are of the formula $M(OH)_x$ wherein M comprises 80 at % Ni or greater and wherein x is 0.7 to 1.2. The particles further include a modifier that is or includes boron wherein the modifier is coprecipitated so as to reside within the particles following precipitation.

M in the formula $M(OH)_x$ includes or is Ni. Ni is present in total M at 80 atomic percent (at %) or greater. Optionally, Ni in total M is present at or greater than 85 atomic percent, optionally 90 atomic percent, optionally 91 atomic percent, optionally 92 atomic percent, optionally 93 atomic percent, optionally 94 atomic percent, optionally 95 atomic percent, optionally 96 atomic percent, optionally 97 atomic percent, optionally 98 atomic percent, optionally 99 atomic percent, optionally 99.5 atomic percent, optionally 99.6 atomic percent, optionally 99.7 atomic percent, optionally 99.8 atomic percent, optionally 99.9 atomic percent.

M in the formula $M(OH)_x$ optionally includes one or more additional metals. A second metal is optionally Mg, Sr, Co, Al, Ca, Cu, Zn, Mn, V, Ba, Zr, Ti, Nb, Ta, Cr, Fe, Mo, W, Hf, B, or any combination thereof. An additional metal is optionally present in an amount of about 0.1 at % to about 20 at %. Optionally, M includes an additional metal that is or includes cobalt, with the cobalt concentration in the range of 0.1 at % to about 20 at %, optionally, in the range of 1 at % to about 15 at %. In some aspects, the additional metal is or includes Mn present in an amount of about 0.1 at % to about 20 at %. Optionally, the additional metal is or includes Al present in an amount of about 0.1 at % to about 20 at %. In some aspects, M in the formula $M(OH)_x$ includes Ni at 80 at % or greater, Co at 0.1 at % to 20 at %, and Mn at 0.1 at % to 20 at %. Optionally M includes Ni at 80 at % or greater and Co at 0.1 at % to 20 at %.

The modifier element in the metal hydroxide particles is present within the particles and distributed as a result of coprecipitation with the metals in the formation of the metal hydroxide particles. The boron modifier is optionally present throughout the particle in a substantially uniform way or distributed within in varying concentration throughout a portion of the entire particle volume.

A modifier element is optionally present within a hydroxide particle at a weight percent (wt %) of 1 wt % or less. In some aspects, a modifier element is present at a weight percent of or less than 0.9 wt %, optionally 0.8 wt %, optionally 0.7 wt %, optionally 0.6 wt %, optionally 0.5 wt %, optionally 0.4 wt %, optionally 0.3 wt %, optionally 0.2 wt %, optionally 0.1 wt %.

The non-lithiated metal hydroxide particles may be made by a coprecipitation method that simultaneously precipitates the metals and boron from one or more components in an aqueous solution or suspension. For example, a nickel salt is combined with a boron modifier as described herein, and optionally one or more other metal salts (e.g. a cobalt salt, a manganese salt, a magnesium salt) where any of such salts may each be a sulphate, a nitrate, an acetate, a halide, a hydroxide, or an oxyhydroxide of the metal. A base material may be added to this solution or suspension to precipitate the boron and the metals into particles whereby the metals are substantially uniformly distributed throughout the particles or designed to be distributed in some other fashion such as in a gradient or other and whereby the boron is included in the resulting hydroxide particles so as to be available to retard crystal growth of metal oxides during a subsequent lithiation reaction.

Optionally, the non-lithiated metal oxide precursor material may be made from the non-lithiated metal hydroxide precursor coprecipitated with a boron modifier by calcination to a specified temperature for a specified time. The specified temperature may be less than 600° C.; optionally less than 550° C.; optionally less than 500° C.; optionally less than 400° C. The specified time may be less than 3 hours, optionally less than 2 hours, optionally 1 hour, optionally less than 0.5 hours. This precursor can then be used to make a lithiated metal oxide cathode material as otherwise described herein.

Also provided are processes of forming an electrochemically active particle suitable for use in a primary or secondary battery, illustratively a lithium ion battery, that includes: forming a precursor particle as provided herein by intermixing a modifier element oxide and a particle of a non-lithiated nickel hydroxide of the formula $M(OH)_x$ wherein M comprises 80 at % Ni or greater and wherein x is 1.7 to 2.3 to form a precursor mixture; and calcining the precursor mixture at a calcination temperature of about 600 degrees Celsius or less and for a calcination time of about 6 hours or less to form a first calcined product that is a boron containing metal oxide. Alternatively, a boron containing metal hydroxide precursor is formed by intermixing or a coprecipitation reaction to form a boron containing metal hydroxide precursor. In so doing, either the oxide precursor, the hydroxide precursor or both may then subsequently be combined with a lithium source and the process further includes calcining the precursor oxide or hydroxide and lithium source to form an electrochemically active particle.

A lithium source may include a lithium salt, such as lithium nitrate, lithium carbonate, lithium hydroxide, or a combination thereof.

The lithium source and the precursor particles as provided herein are sintered. Sintering may be performed by heating at a rate of about 5° C. per minute to about 450° C., and holding at about 450° C. for about two hours. The temperature may then be raised at about 2° C. per minute to about 680° C., and held for about six hours. The sample may then be allowed to cool naturally to room temperature. The resulting electrochemically active material is used as an active material in a cathode of a lithium ion cell.

A process of forming an electrochemically active material optionally further includes enriching the grain boundaries of the resulting electrochemically active particle with one or more of Co and Al. Illustrative processes of enriching a grain boundary with Co is described in U.S. Pat. No. 9,391,317. Processes of enriching grain boundaries with Co, Al, or Co and Al are described in U.S. patent application Ser. No. 16/250,615. Such Co, Al, or Co and Al grain boundary enriched materials may be readily manufactured by calcining a green body formulation including a LiOH and a precursor material particle as provided herein to form electrochemically active particles with defined grain boundaries and then enriching the grain boundaries with Co, Al, or a combination of Co and Al such that the resulting particles have grain boundaries where the concentration of Co, Al, or Co and Al in the grain boundary is greater than prior to enrichment and optionally greater than within the primary crystallites, the outer surfaces of which define the edges of the grain boundaries in the secondary particle.

Illustratively, a process of forming an electrochemically active particle suitable for use in a cathode of a secondary battery further includes: immersing the electrochemically active particle in a process solution comprising Co alone or Co and Al; drying electrochemically active particle following the immersing; and heat treating the electrochemically active particle following the drying to form a particle wherein a concentration of Co, Al, or both in a grain boundary is greater than a concentration of Al, Co, or both in the crystallites.

A grain boundary enriched particle may be formed by a multi-step process whereby a precursor particle material is formed as an oxide or hydroxide intermixed with a modifier element as provided herein and calcined, optionally in the presence of Li so as to establish the formation of defined grain boundaries optionally with the primary particles having α-NaFeO$_2$ structure with few if any crystal defects. The particles are then subjected to a liquid process that applies Co, Al, or Co and Al at the desired concentration levels followed by drying and then a heat treatment so as to move the Co or Al precipitated species at the surface selectively into the grain boundaries to thereby form the secondary particle having a concentration of Co and Al in the grain boundaries that is higher than in the crystallites.

According to methods of manufacturing a secondary particle that has a base of nickel oxide as provided herein as provided herein as an example, formation may include: combining a lithium compound, and a nickel oxide or hydroxide precursor of one or more metals or metalloids as provided herein (e.g. Ni, Co, and Mg combined) to form a mixture; heat treating the mixture by a second calcination at about 30 to about 200° C. to form a dried mixture; heat treating the dried mixture at about 200 to about 500° C. for about 0.1 to about 5 hours; then heat treating at 600° C. to less than about 800° C. for about 0.1 to about 10 hours to manufacture the lithiated secondary particle. A second calcination maximum temperature is relative and specific to the material used in the oxide precursor. Optionally, in a second calcination, a maximum temperature may be at or less than 850 degrees Celsius, optionally at or less than 720 degrees Celsius, optionally at or less than 715 degrees Celsius, optionally at or less than 710 degrees Celsius, optionally at or less than 705 degrees Celsius, optionally at or less than 700 degrees Celsius. Optionally, the maximum temperature of the second calcination may be about 680 degrees Celsius or less. Optionally, the maximum temperature may be about 660 degrees Celsius or less. Optionally, the maximum temperature may be about 640 degrees Celsius or less. In yet other aspects, the maximum temperature may be less than about 700 degrees Celsius, about 695 degrees Celsius, about 690 degrees Celsius, about 685 degrees Celsius, about 680 degrees Celsius, about 675 degrees Celsius, about 670 degrees Celsius, about 665 degree Celsius, about 660 degrees Celsius, about 655 degrees Celsius, about 650 degrees Celsius, about 645 degrees Celsius, or about 640 degrees Celsius. The dwell time at the maximum temperature is optionally less than 10 hours. Optionally, the dwell time at the maximum temperature is less than or equal to 8 hours; optionally less than or equal to 7 hours; optionally less than or equal to 6 hours; optionally less than or equal to 5 hours; optionally less than or equal to 4 hours; optionally less than or equal to 3 hours; optionally less than or equal to 2 hours.

After calcination, subsequent processing may include breaking up the electrochemically active material with a mortar and pestle so that the resulting powder passes through a desired sieve, optionally a #35 sieve. The powder is optionally then jar milled in a 1 gallon jar with a 2 cm drum YSZ media for optionally 5 minutes or an adequate time such that the material may pass through optionally a #270 sieve.

The electrochemically active product of the second calcination (or first calcination when metal hydroxide precursor particles are used) may be subsequently processed, optionally in a method so as to result in enriched grain boundaries following a third calcination. The grain-boundary-enriching Co or Al may optionally be applied by suspending the milled product in an aqueous slurry comprising Co, Al, or Co/Al, and a lithium compound optionally at a temperature of about 60 degrees Celsius whereby the Co and Al are present in the aqueous solution (process solution) at the concentrations as desired. The slurry may then be spray dried to form a free-flowing powder that is then subjected to a third calcination optionally with a heating curve following a two ramp/dwell process. The first two ramp/dwell temperature profile may be from ambient (about 25 degree Celsius) to 450 degrees Celsius and optionally at a rate of 5 degree Celsius per minute with a 1 hour hold at 450 degrees Celsius. Subsequently, the second ramp/dwell may be from 450 degrees Celsius to a maximum temperature at a rate of 2 degree Celsius per minute with a 2 hour hold at the maximum temperature. In some aspects, the maximum temperature is less than about 725 degrees Celsius, optionally at or about 700 degrees Celsius.

The amounts of Co, Al, or Co and Al present in the process solution as follows are relative to total M in the precursor particle.

The amount of Co in the process solution is optionally 0.01 at % to 10 at %, optionally 9 at % or less, optionally 8 at % or less, optionally 7 at % or less, optionally 6 at % or less, optionally 5 at % or less, optionally 4 at % or less, optionally 3 at % or less, optionally 2 at % or less, optionally 1 at % or less, optionally 0.1 to 1 at %, optionally 0.5 to 1 at %.

The amount of Al in the process solution is optionally 0.01 at % to 10 at %, optionally 9 at % or less, optionally 8 at % or less, optionally 7 at % or less, optionally 6 at % or less, optionally 5 at % or less, optionally 4 at % or less, optionally 3 at % or less, optionally 2 at % or less, optionally 1 at % or less, optionally 0.1 to 1 at %, optionally 0.5 to 1 at %. Optionally, the amount of Al in the process solution is at or less than an atomic percentage of 0.1, 0.2, 0.3, 0.4, 0.5, 0.6, 0.7, 0.8, 0.9, 1.0, 1.1, 1.2, 1.3, 1.4, or 1.5.

In some aspects, the amount of Co in the process solution is optionally 0.01 at % to 10 at %, optionally 9 at % or less, optionally 8 at % or less, optionally 7 at % or less, optionally 6 at % or less, optionally 5 at % or less, optionally 4 at % or less, optionally 3 at % or less, optionally 2 at % or less, optionally 1 at % or less, optionally 0.1 to 1 at %, optionally 0.5 to 1 at %; and the amount of Al in the process solution is optionally 0.01 at % to 10 at %, optionally 9 at % or less, optionally 8 at % or less, optionally 7 at % or less, optionally 6 at % or less, optionally 5 at % or less, optionally 4 at % or less, optionally 3 at % or less, optionally 2 at % or less, optionally 1 at % or less, optionally 0.1 to 1 at %, optionally 0.5 to 1 at %. Optionally, the amount of Al in the process solution is at or less than an atomic percentage of 0.1, 0.2, 0.3, 0.4, 0.5, 0.6, 0.7, 0.8, 0.9, 1.0, 1.1, 1.2, 1.3, 1.4, or 1.5.

Various aspects of the present disclosure are illustrated by the following non-limiting examples. The examples are for illustrative purposes and are not a limitation on any practice of the present invention. It will be understood that variations and modifications can be made without departing from the spirit and scope of the invention.

EXAMPLES

Example 1: Synthesis of Transition Metal Oxide Precursor Containing Boron

Three transition metal hydroxide precursor materials, each containing 8 at % cobalt and 92% nickel with a 5 micrometer D50 size, were mixed with 0.25 wt % boron oxide and fired at 500° C. for 5 hours in air. The three materials were from different lots or different manufacturers. As controls, the three metal hydroxide precursors were fired at 500° C. for 5 hours without any boron oxide addition. Powder XRD analyses of the resulting six black-grey powders showed the crystallite sizes for the 0.25% boron oxides samples are substantially smaller than those formed without boron oxide (Table 1).

TABLE 1

Metal oxide crystallite size as determined by X-Ray Diffraction

| Precursor | Boron Oxide | Oxide Crystallite Size (nm) |
| --- | --- | --- |
| 536-165 | 0.0% | 26.5 |
| 536-166 | 0.0% | 24.5 |
| 536-167-3 | 0.0% | 24.9 |
| 536-165B | 0.25% | 16.3 |
| 536-166B | 0.25% | 16.8 |
| 536-167-3B | 0.25% | 17.7 |

Subsequently 1 gram (g) of each calcined sample was mixed with 10 g water and stirred at room temperature for 20 minutes. The resulting pH for all samples that were formed without boron oxide was above 7. The samples formed with boron oxide mixed with water showed pH<6, consistent with the expected acidity of boron oxide in water. Therefore, calcining the metal hydroxide with boron oxide resulted in a material wherein the boron oxide remained available for aqueous extraction.

Example 2: Preparation of Cathode Materials with Boron Containing Nickel Oxides

Nickel oxides containing various levels of boron (0.66 wt %, 1.66 wt %, or 2.62 wt %) were prepared by the method discussed in Example 1. These nickel oxides were then mixed with LiOH and calcined to form electrochemically active cathode materials. The cathode samples were then washed with water (shaken 5 minutes (mins) with 1 gram (g) sample and 10 g water), centrifuged and the supernatant filtered through 0.45 µm syringe filters. The supernatant was then titrated with 0.1N HCl— the titration curves are shown in FIG. 1. With increasing boron doping, more buffering is observed, consistent with the existence of soluble borate species exterior to the particles.

In the analysis of the titration curves, the range for the lithiated borate species is set to 7 to 12.3. To remove titration of LiOH either exterior to the particles or extracted from them by the water wash, equivalents titrated for the control between 12.3 to 11.0 was subtracted from the other materials. To remove the carbonate present, the equivalents titrated below 7 were subtracted from the 7-12.3 equivalents. In this way the titration of the bicarbonate ion was used to subtract the carbonate contribution to the 7-12.3 range.

The calculated boron extracted from the samples is consistent with the amount formulated into the product when a lithium-to-boron ratio "LiB" of 4 is assumed. Such a species would be unusual $Li_8B_2O_7$. However, when the more common lithium orthoborate species $Li_3BO_3$, with an Li:B of 3, is assumed, more apparent boron is found than is was formulated. A highly lithiated borate species is indicated by the very high pH of the first buffering range, essentially at 12. In either case, it is clear that most of the boron is observed external to the particle by the borate buffering observed around pH 9.5. Elemental analysis of wash water and unwashed materials also support the conclusion that the borate species are readily washed from the finished cathode products as lithiated borate species; therefore, very little boron doping of the final products is expected.

TABLE 2

Summary of titrations corresponding to FIG. 1.

| Sample | Formulated | Titrated LiB = 3 | Titrated LiB = 4 |
|---|---|---|---|
| A | 0 | — | — |
| B | 0.66% | 1.2% | 0.89% |
| C | 1.66% | 2.1% | 1.55% |
| D | 2.62% | 3.1% | 2.30% |

TABLE 3

Elemental analysis to estimate the amount of boron in the as made finished cathode particles, and the wash water.

| Sample | Formulated | Boron in Unwashed solid | Boron in Wash Water |
|---|---|---|---|
| A | 0.00% | BDL | BDL |
| B | 0.66% | 0.61% | 0.57% |

TABLE 3-continued

Elemental analysis to estimate the amount of boron in the as made finished cathode particles, and the wash water.

| Sample | Formulated | Boron in Unwashed solid | Boron in Wash Water |
|---|---|---|---|
| C | 1.66% | 1.72% | 1.31% |
| D | 2.62% | 2.52% | 2.35% |

Example 3: Synthesis of Cathode Materials for Li-Ion Batteries

Two electrochemically active materials suitable for use in a cathode of a lithium ion battery were made from a single transition metal precursor, comprising 8% cobalt and 92% nickel as total metal. One sample was used as a control while the other was mixed with 0.25 wt % micronized boron oxide. Both samples were calcined at 500° C. for 5 hours. After calcination, each sample was converted to a cathode material by first blending with micronized lithium hydroxide, in stoichiometric quantities to make lithium transition metal oxide and, $Li_3BO_3$ for the sample with boron. Both mixtures were then calcined at 700° C. for 6 hours under $CO_2$-free air. The electrochemically active cathode materials were then milled and sieved through 325 mesh sieve.

The cathode products were grain-boundary-enriched with Co and Al. As such, the powders were blended in an equivalent mass of water containing cobalt nitrates such that the cobalt was 4 at % relative to total metal of the cathode material and the final lithium-to-transition ratio was 1.01, and the final Al content was 0.064% of the final transition metals content of the cathode material. The slurry was spray dried and heat-treated at 700° C. for 2 hours to form the final cathode material.

Figure 2:
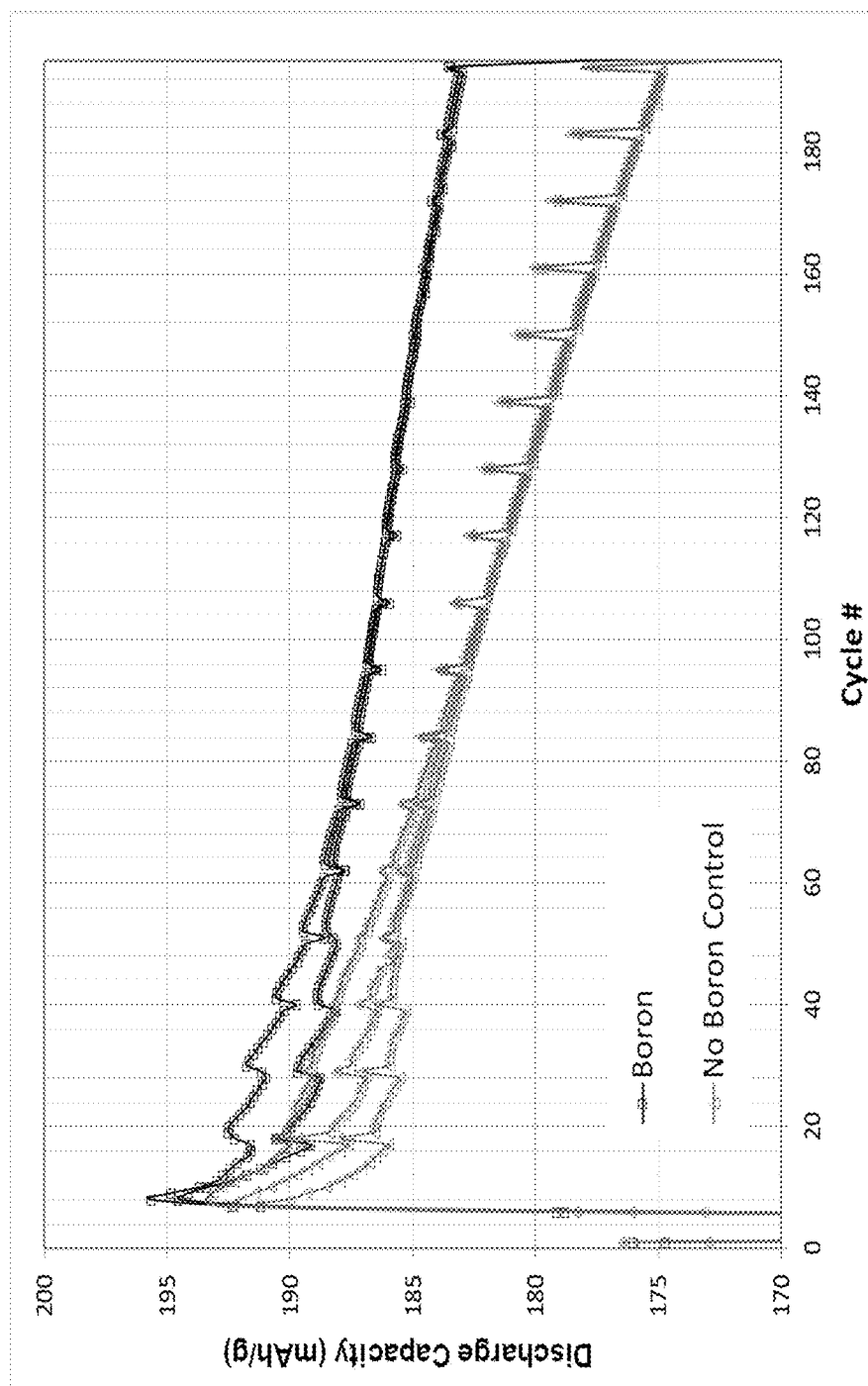
FIG. 2 illustrates cycle life of cathode materials made with the particles according to some aspects as provided herein, measured at 45° C. in coin full cells with graphite anode.
Figure 3:
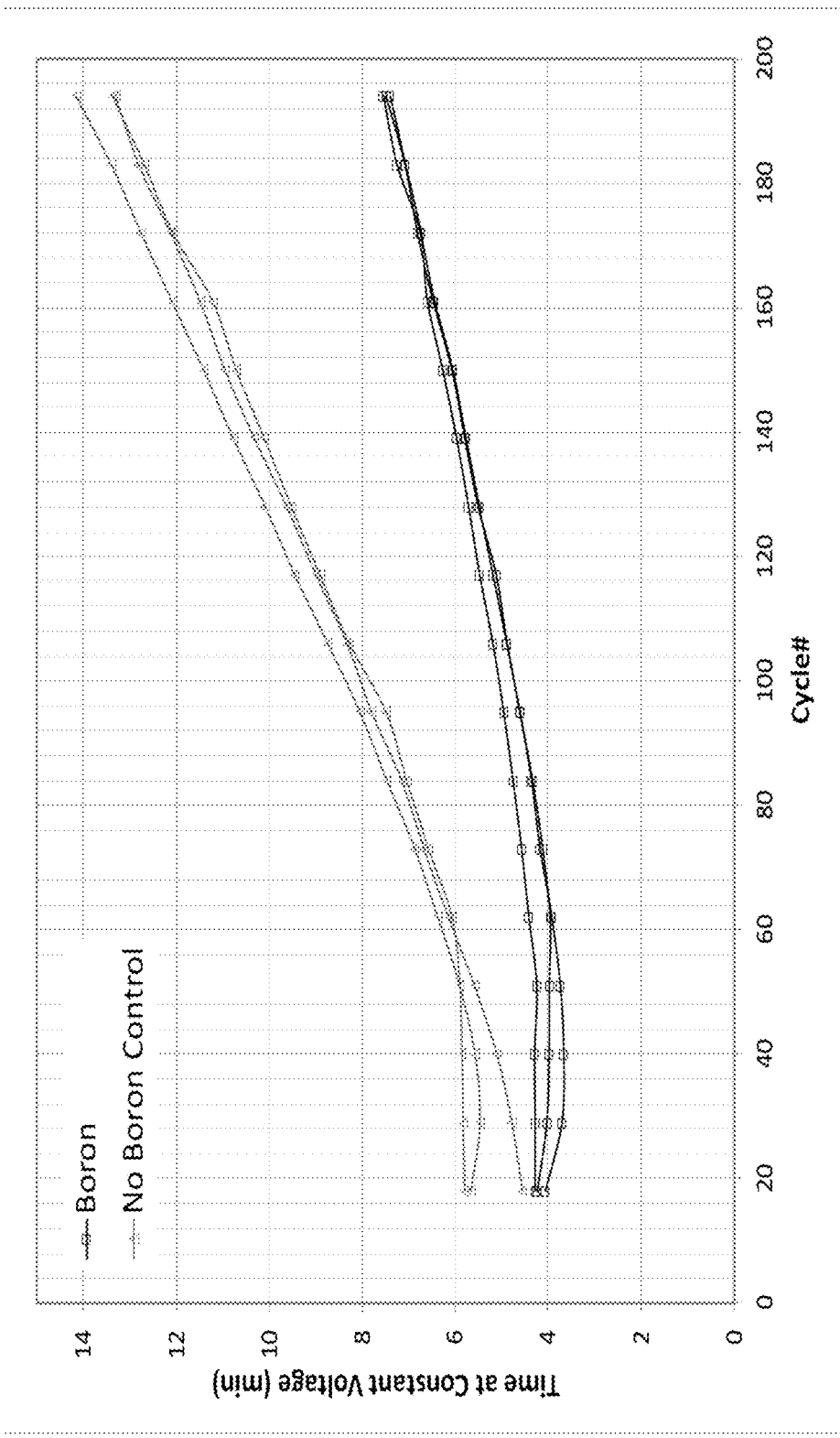
FIG. 3 illustrates the impedance increase corresponding to cycle life data in FIG. 2.

Electrodes were made by blending cathode powders with NMP, conductive carbon and PVDF binder and coating onto Aluminum foil. Coin cells were built with an MCMB anode and cycled at 45° C. for 200 cycles. The results are presented in FIG. 2 and FIG. 3.

Example 4: Extraction of Boron from Formed Precursor Particles

Two nickel oxide materials were formed with a hydroxide material containing 100% nickel using the process described in Example 1. One had 0.25 wt % $B_2O_3$ in the initial formulation with the hydroxide while the other had no $B_2O_3$. One gram of each was then added to 10 milliliters (mL) of nitric acid containing 10 millimolar (mM) sodium dodecyl sulfonate (SDS), stirred for 5 hours and then allowed to sit overnight. The supernatant was then removed and filtered through a 0.45 µm syringe filter and tested for nickel and boron using ICP-OES. The results are presented in Table 4.

TABLE 4

| Sample ID | Ni (mg extracted) | B (mg extracted) |
|---|---|---|
| A: NiO-B | 27 | 0.6 |
| B: NiO-B | 30 | 0.5 |
| C: NiO | 21 | 0.09 |

The amount of boron formulated into the oxides was 1.2 mg per g of NiO. This process extracted roughly 50% of the boron while only removing 0.05% of the nickel. This supports the conclusion that the boron is present external to the nickel crystallites and is not doping them. All of the boron was not extracted because the porous nickel oxide particles have very small pores that are not accessible to the aqueous extractant.

Access to all the porous oxide particles was shown to be an issue by earlier results where the same experiment was conducted for the extraction of boron but with only 20 minutes of exposure. In this case, one sample was formulated as above, with 10 mM SDS added, and one was formulated without. The SDS sample extracted 0.3 mg of boron while the sample without the surfactant only extracted 0.2 mg. Therefore, limited access of the nitric acid extractant to the entirety of the porous matrix is anticipated to be a problem and this is partially mitigated by the use of surfact-tension-lowering agents like SDS.

Comparative Example 1: Boron Oxide as Cathode Additive

A transition metal hydroxide powder was blended with sufficient lithium hydroxide to effect the synthesis of lithium transition-metal oxide cathode material and fired at 700° C. for 6 hours under $CO_2$-free air. After heat treatment, the product was milled and sieved through a 325 mesh sieve.

The product was then divided into three, and each was grain-boundary-enriched with cobalt (as per U.S. Pat. No. 9,391,317). As such, cathode materials were suspended in equivalent masses of water containing cobalt and lithium nitrates. The cobalt was 4 at % of the material and the final lithium ratio to transition metals was 1.01. Boron oxide was added to two of the slurries, to mimic the formulation of either 0.1 wt % or 0.25 wt % boron oxide blended as in Example 2. To these solutions, additional lithium was added so that $Li_3BO_3$ could be formed. Each slurry was spray dried and then heat treated for 2 hours at 700° C. under $CO_2$-free air.

The final products were then made into electrodes by slurrying with NMP, conductive carbon and PVDF binder and coated on aluminum foil. The final electrode was 94% active with the balance split evenly between binder and conductive additive. Coin cells were then built with an MCMB anode and cycled at 45° C.

Figure 4:
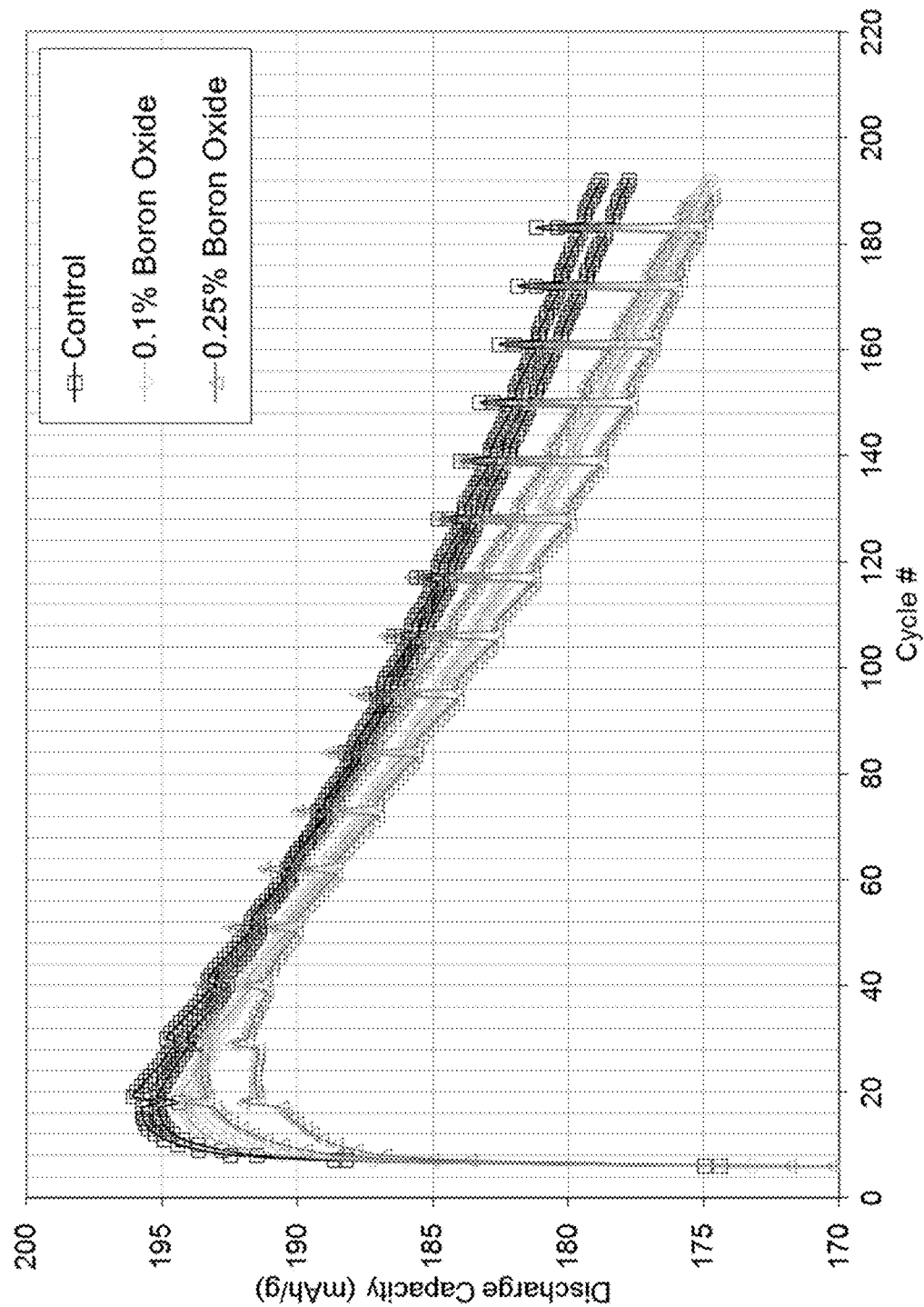
FIG. 4 illustrates cycle life of cathode materials made using standard hydroxide precursors but with added boron oxide, measured at 45° C. in coin full cells with graphite anode.
Figure 5:
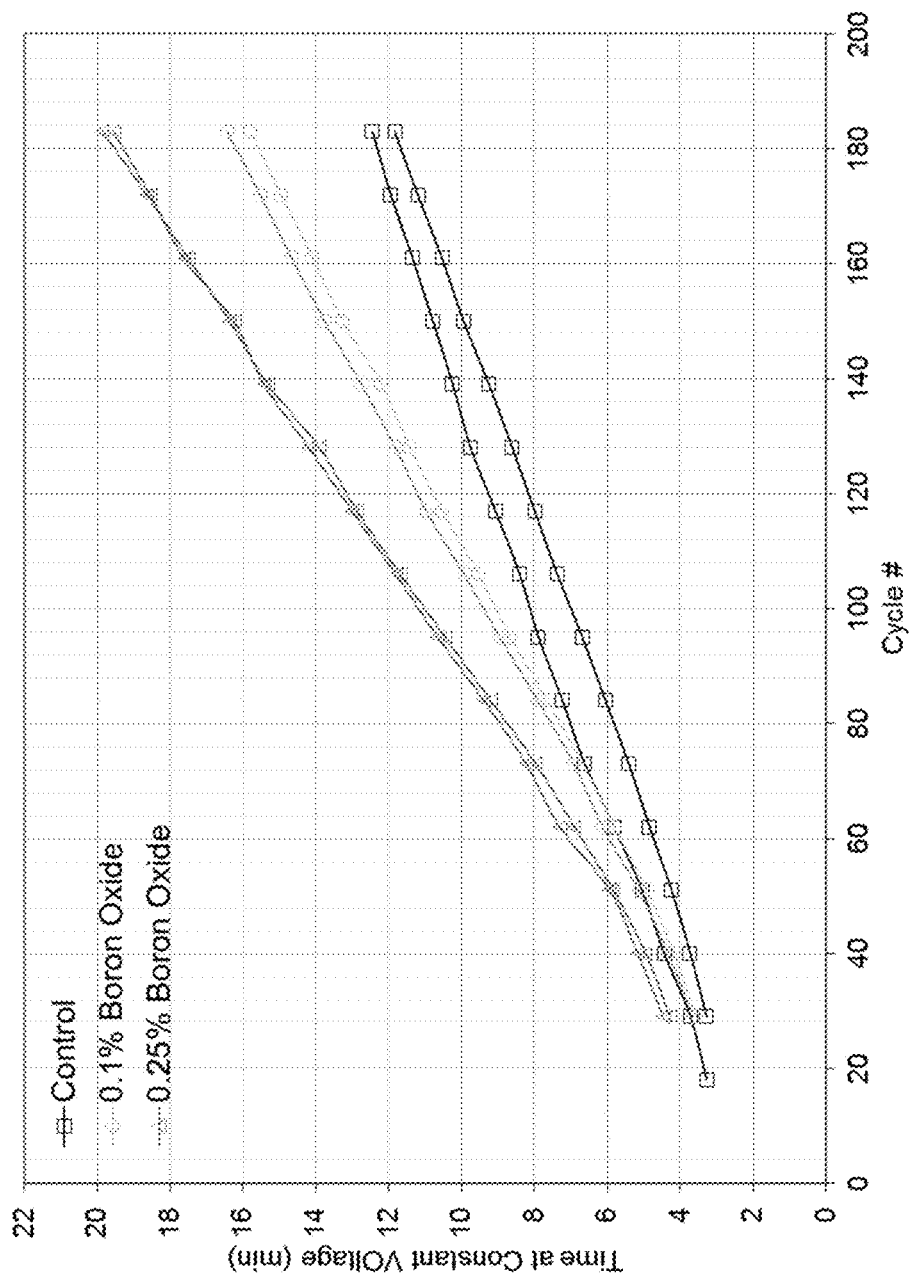
FIG. 5 illustrates the impedance increase corresponding to cycle life data in FIG. 4.

The capacity fade of the above materials is shown in FIG. 4. The fade for all the materials is similar, however, those with boron are slightly poorer than the control. Impedance growth, as represented by time at constant voltage on charge, is shown in FIG. 5. Here more differentiation is seen between the materials. Greater impedance growth is observed for the comparative materials made with boron additive with more boron showing higher rates of impedance growth.

These results show that a simple additive to the cathode material at the cobalt coating stage results in poorer electrochemical performance. Since, for the oxide-treatment process, all of the boron originally formulated is released during the cathode synthesis as a lithiated oxide, adding boron oxide at the point of cobalt coating should be chemically equivalent. Nonetheless, poorer, not better electrochemical performance is observed. This demonstrates that the boron oxide modifier is in fact at the point of initial heat treatment and subsequent synthesis and not simply as a cathode-surface additive in the final product. Indeed, the benefit accrued to the product by the boron modifier process is observed despite the deleterious impact of any lithiated borate byproduct remaining in the final product.

The foregoing description of particular aspect(s) is merely exemplary in nature and is in no way intended to limit the scope of the disclosure, its application or uses, which may of course vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, unless specified otherwise, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications, in addition to those shown and described herein, will be apparent to those skilled in the art of the above description. Such modifications are also intended to fall within the scope of the disclosure.

It is appreciated that all reagents are obtainable by sources known in the art unless otherwise specified.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof.

We claim:

1. A process of forming an electrochemically active particle suitable for use in a cathode of a secondary battery comprising:
   intermixing boron oxide and a particle of a non-lithiated nickel hydroxide of the formula $M(OH)_x$ wherein M comprises 80 at % Ni or greater and wherein x is 1.7 to 2.3 to form a precursor mixture;
   calcining the precursor mixture at a calcination temperature of about 600 degrees Celsius or less and for a calcination time of about 6 hours or less to form a first calcined product;
   combining the first calcined product with a lithium source and calcining the first calcined product and lithium source to form an electrochemically active particle.

2. The process of claim 1 further comprising:
   immersing said electrochemically active particle in a process solution comprising Co alone or Co and Al;
   drying said electrochemically active particle following the immersing; and
   heat treating said electrochemically active particle following the drying to form a particle wherein a concentration of Co, Al, or both in a grain boundary is greater than a concentration of Al, Co, or both in crystallites.

3. The process of claim 1 wherein the nickel is present at 92 atomic percent or greater of total M.

4. The process of claim 1 wherein the nickel is present at 99 atomic percent or greater of total M.

5. The process of claim 1 wherein the boron oxide is present at less than 1 wt % relative to the non-lithiated nickel oxide particle.

6. The process of claim 1 wherein M comprises Ni and one or more elements of Mg, Sr, Co, Al, Ca, Cu, Zn, Mn, V, Ba, Zr, Ti, Nb, Ta, Cr, Fe, Mo, W, Hf, B, or any combination thereof.

7. The process of claim 1 wherein M comprises Ni and Co.

8. The process of claim 1 wherein the first calcined product has an average crystallite size as measured by X-Ray Diffraction of less than 30 nm.

9. The process of claim 8 wherein Ni is present at 92 atomic percent or greater.

10. The process of claim 9 wherein M comprises Ni and one or more elements of Mg, Sr, Co, Al, Ca, Cu, Zn, Mn, V, Ba, Zr, Ti, Nb, Ta, Cr, Fe, Mo, W, Hf, B, or any combination thereof.

11. The process of claim 10 wherein the boron oxide is present at less than 1 wt % relative to the non-lithiated nickel oxide particle.

* * * * *